(12) United States Patent
Su et al.

(10) Patent No.: US 11,486,433 B2
(45) Date of Patent: Nov. 1, 2022

(54) SELF-DRILLING SCREW

(71) Applicant: TAIWAN SHAN YIN INTERNATIONAL CO., LTD., Kaohsiung (TW)

(72) Inventors: Kou-Tsair Su, Kaohsiung (TW); Yu-Jung Su, Kaohsiung (TW)

(73) Assignee: Taiwan Shan Yin International Co., Ltd., Kaohsiung (TW)

(*) Notice: Subject to any disclaimer, the term of this patent is extended or adjusted under 35 U.S.C. 154(b) by 411 days.

(21) Appl. No.: 16/739,529

(22) Filed: Jan. 10, 2020

(65) Prior Publication Data

US 2021/0215185 A1 Jul. 15, 2021

(51) Int. Cl.
*F16B 25/00* (2006.01)
*F16B 25/10* (2006.01)

(52) U.S. Cl.
CPC ...... *F16B 25/0042* (2013.01); *F16B 25/0084* (2013.01); *F16B 25/10* (2013.01); *F16B 25/00* (2013.01)

(58) Field of Classification Search
CPC .............. F16B 25/0021; F16B 25/0031; F16B 25/0042; F16B 25/0084; F16B 25/10; F16B 25/103; F16B 25/00
USPC .............. 411/387.1, 387.6, 387.7, 387.8
See application file for complete search history.

(56) References Cited

U.S. PATENT DOCUMENTS

| 4,114,508 A | 9/1978 | Jeal |
| 4,568,229 A | 2/1986 | Hulsey |
| 4,708,557 A | 11/1987 | Hashimoto |
| 5,074,729 A * | 12/1991 | Oba .................... F16B 25/0084 408/230 |
| 5,308,286 A | 5/1994 | Uejima |
| 6,676,353 B1 * | 1/2004 | Haytayan .............. F16B 25/103 206/346 |
| 7,290,972 B2 * | 11/2007 | Gauthier ............... F16B 13/002 411/389 |
| 8,348,573 B2 * | 1/2013 | Chang ................. F16B 25/0084 411/386 |

(Continued)

FOREIGN PATENT DOCUMENTS

| CN | 203201940 U | 9/2013 |
| CN | 205668086 U | 11/2016 |

(Continued)

*Primary Examiner* — Roberta S Delisle
(74) *Attorney, Agent, or Firm* — Rosenberg, Klein & Lee

(57) ABSTRACT

A self-drilling screw includes a leading section having a drill body and opposite discharge grooves formed on the drill body. The drill body and the discharge grooves meet at cutting edges. On the drill body are formed two blade portions connected to the cutting edges and tapering at respective second tips. The blade portion has a second included angle of not more than 50 degrees. Between the blade portions is formed a drilling portion terminating at a first tip and having a first included angle of not more than 60 degrees. Two opposite concave surfaces each extend from the drilling portion to each blade portion. The first tip and the second tips are situated at different places. Accordingly, the end of the leading section presents a shape of a curved bow riser to cut quickly and help quick removal of chips, thereby decreasing resistance and preventing the cracking problem.

4 Claims, 7 Drawing Sheets

(56) References Cited

U.S. PATENT DOCUMENTS

| | | | | |
|---|---|---|---|---|
| 8,511,958 B2* | 8/2013 | Chang | ............... | F16B 25/103 |
| | | | | 411/387.7 |
| 8,613,579 B2* | 12/2013 | Loichinger | ......... | F16B 25/0031 |
| | | | | 411/387.1 |
| 8,858,145 B2* | 10/2014 | Su | ..................... | F16B 35/065 |
| | | | | 411/399 |
| 2004/0018069 A1 | 1/2004 | Lai | | |
| 2014/0334898 A1* | 11/2014 | Taylor | ............... | F16B 35/06 |
| | | | | 411/413 |

FOREIGN PATENT DOCUMENTS

| | | | |
|---|---|---|---|
| EP | 468089 | A2 | 10/1990 |
| EP | 507474 | A1 | 3/1992 |
| JP | 2001-304218 | A | 10/2001 |
| TW | M380396 | U1 | 5/2010 |
| TW | M424409 | U1 | 3/2012 |
| TW | I560371 | B | 12/2016 |

\* cited by examiner

SELF-DRILLING SCREW

BACKGROUND OF THE INVENTION

1. Field of the Invention

This invention relates to a screw and relates particularly to a self-drilling screw.

2. Description of the Related Art

FIG. 1 shows a conventional self-drilling screw 1 disclosed by Taiwan patent no. 1560371. The screw 1 includes a head 11, a shank 12 connected to the head 11 and provided with threads spirally formed thereon, and a drilling portion 13 connected to the shank 12. The drilling portion 13 has a drilling body 131 extending from the shank 12, two opposite flutes 133 formed on the drilling body 131, and opposite bevel surfaces 132 connected to the drilling body 131 and converging on a tip 134 with an included angle 134a. Two cutting edges 135 each are formed at a place where the flute 133 and the bevel surface 132 meet. In operation, a force is added to rotate the head 11 after the tip 134 is put on a surface of a workpiece (not shown). The cutting edges 135 serve to cut the workpiece, and then chips caused by the cutting action travel along the flute 133 for being removed from the workpiece. The shank 12 with thread convolutions are gradually screwed into the workpiece during the cutting action, thereby completing a screwing operation.

Generally, the included angle 134a affects the cutting performance of the cutting edges 135 and the sharpness of the tip 134. For example, if the included angle 134a is smaller, the tip 134 becomes sharper and is easy to puncture the surface of the workpiece. However, the small included angle 134a cause the reduction in the area of the cutting edges 135, and this reduction decreases the cutting effect and renders the screw 1 unable to be smoothly screwed into the workpiece. To solve this problem, the included angle 134a is generally set above 120 degrees. However, the angle of more than 120 degrees is unfavorable to the operation of positioning the screw 1 because the sharpness of the tip 134 declines.

Furthermore, the tip 134 serves as a single contact point for meeting the surface of the workpiece at the beginning of the screwing operation, and the friction between the tip 134 and the workpiece is small when the workpiece has a glossy surface. Accordingly, the tip 134 cannot stand upright on the surface of the workpiece efficiently in case the tip 134 is not sharp enough. In that case, the screw 1 deviates from its normal screwing path easily and thus is unable to be smoothly screwed into the workpiece. The improper screwing operation of the screw 1 also breaks the surface of the workpiece easily. In addition, chips are generated between the bevel surfaces 132 when the cutting edges 135 execute the cutting operation. This situation causes the entrance to the flutes 133 to be easily blocked by the accumulation of the chips and incurs high screwing resistance. The excessive accumulation of the chips also adds undue pressure to the workpiece and causes the workpiece to crack easily during the operation. Thus, the screw 1 needs to be improved.

SUMMARY OF THE INVENTION

The object of this invention is to provide a self-drilling screw capable of screwing accurately, quickly, and firmly and also capable of decreasing screwing resistance and preventing the workpiece from cracking during the screwing operation.

The self-drilling screw of this invention includes a head with a bottom surface, a shank extending longitudinally from the bottom surface of the head and defining a central axis, and a plurality of thread convolutions spirally disposed around the shank. The shank forms a leading section located opposite to the head. The leading section includes a drill body, two opposite discharge grooves formed on opposite sides of the drill body, and two cutting edges each formed at a place where the drill body meets each of the two opposite discharge grooves. A drilling portion is formed at a distal end of the drill body opposite to the head and terminates at a first tip. The central axis of the shank passes through the first tip. Two blade portions are formed on the drill body and located opposite to each other so that the drilling portion is located between the two blade portions. Each blade portion is connected to each of the two cutting edges and tapers at a second tip. Two opposite concave surfaces are recessedly formed on the opposite sides of the drill body. Each of the two concave surfaces extends from the drilling portion to each of the blade portions. The drilling portion has a first included angle of not more than 60 degrees. Each blade portion has a second included angle of not more than 50 degrees. A distance between the first tip and the head is larger than a distance between the second tip and the head. Accordingly, when the concave surfaces are formed from the drilling portion and the blade portions, the end of the leading section shows a shape of a curved bow riser when viewed in a bottom plan view whereby the drilling portion is accurately positioned on a surface of the workpiece at the beginning of the screwing operation, and the blade portions cut the workpiece quickly in a sharp way. Chips caused by the cutting operation are quickly led to the concave surfaces and the discharge grooves for quick removal and are concurrently severed by the cutting edges for preventing the entanglement and undue accumulation of the chips, decreasing resistance to the screwing operation, and preventing the workpiece from cracking.

Preferably, each of the cutting edges, each of the blade portions, or both of the cutting edge and the blade portion can extend in a counterclockwise direction when viewed from the distal end of the drill body for facilitating a smooth and sharp cutting operation.

Preferably, the bottom surface of the head has a plurality of slots formed thereon, thereby allowing the head to be flush with the surface of the workpiece.

DETAILED DESCRIPTION OF THE PREFERRED EMBODIMENTS

Figure 1:
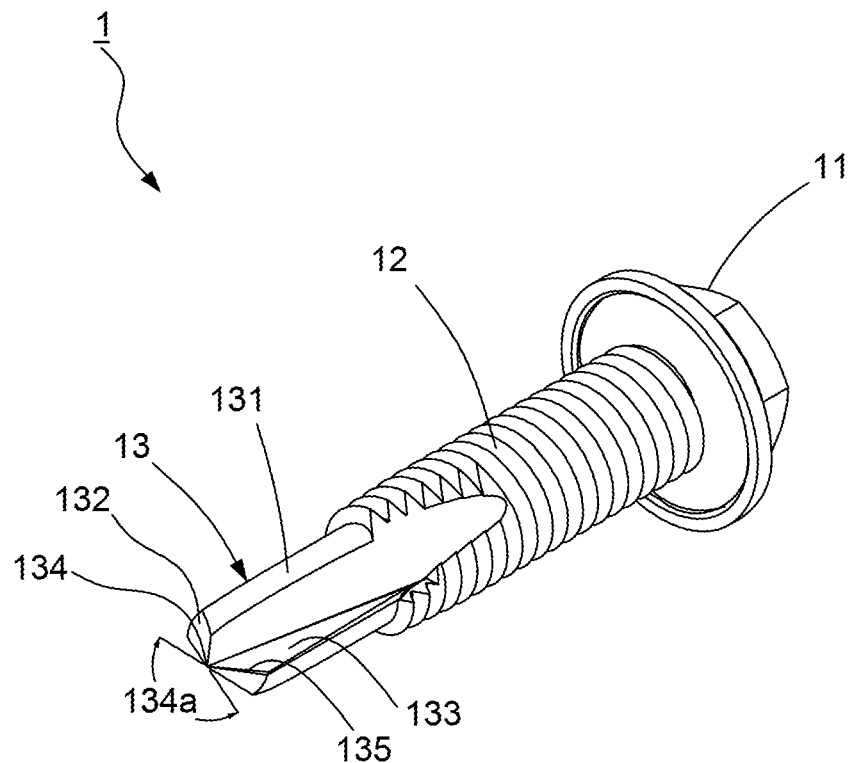
FIG. 1 is a perspective view showing a conventional self-drilling screw.
Figures 2, 2A:
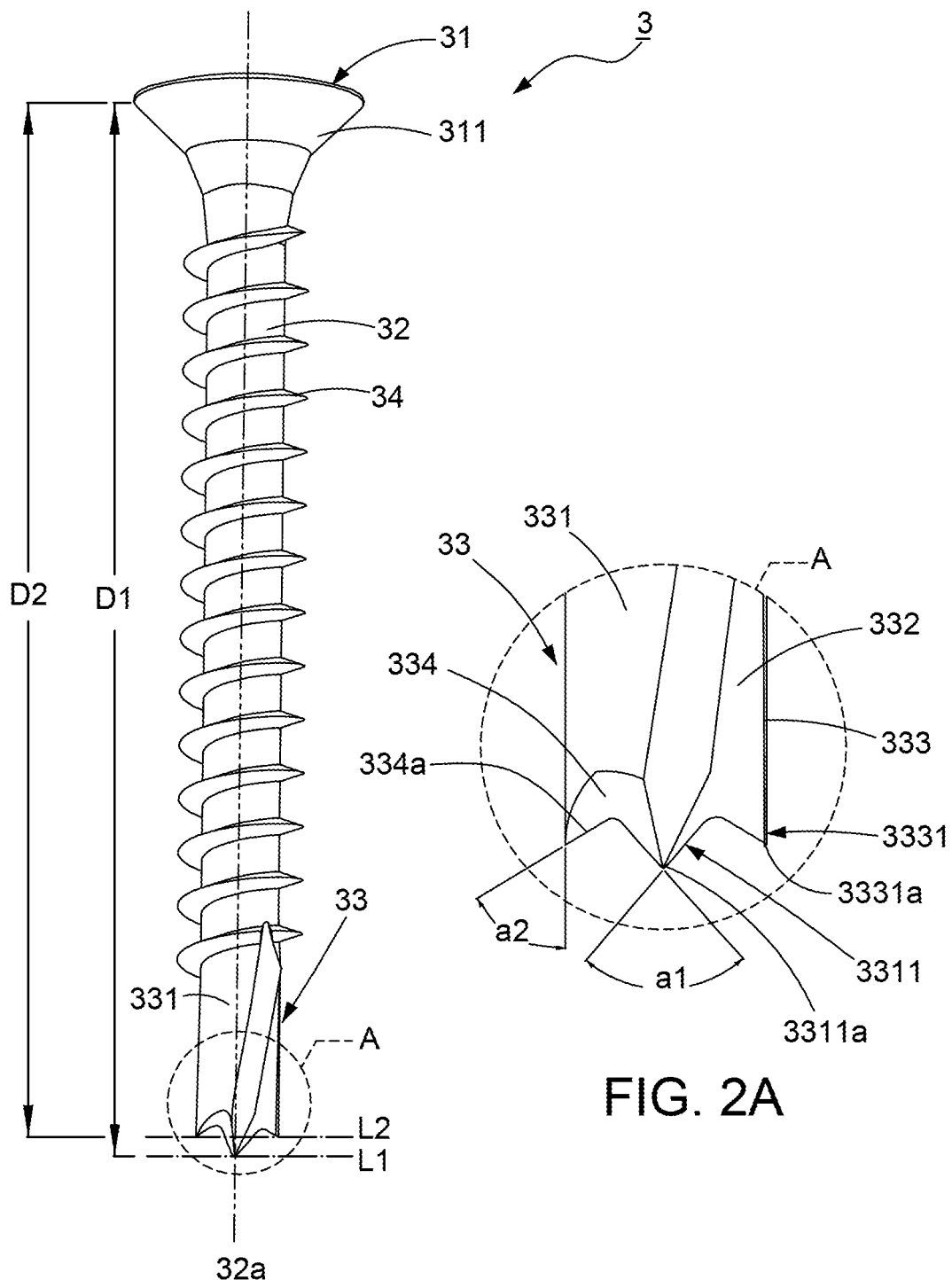
FIG. 2 is a schematic view showing a first preferred embodiment of this invention in a front elevational view.
FIG. 2A is an enlarged view showing the encircled portion A of FIG. 2.
Figure 4:
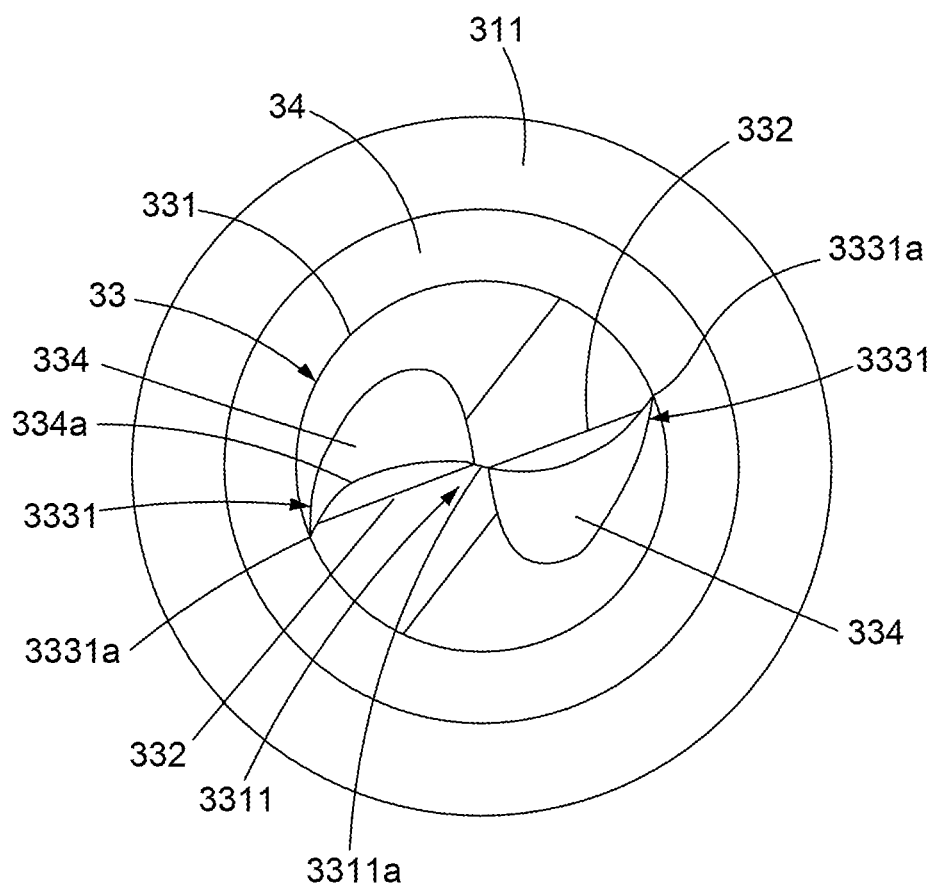
FIG. 4 is a bottom plan view of FIG. 2.

Referring to FIG. 2 and FIG. 2A, a first preferred embodiment of a self-drilling screw 3 includes a head 31 having a bottom surface 311, a shank 32 extending longitudinally from the bottom surface 311 and defining a central axis 32a, and a plurality of thread convolutions 34 spirally disposed around the shank 32. A leading section 33 is defined on the shank 32. Specifically, the shank 32 forms the leading section 33 located opposite to the head 31. As shown in FIG. 4, the leading section 331 includes a drill body 331 extending by a certain length, two opposite discharge grooves 332 formed on opposite sides of the drill body 331, and two cutting edges 333 formed opposite to each other. Each cutting edge 333 is formed at a place where the drill body 331 meets each discharge groove 332. It is noted that each discharge groove 332 is enclosed by a wall surface which may be vertical, inclined, or curved, and the cutting edge 333, as shown, is the place where the wall surface of the discharge groove 332 come into contact with the adjacent drill body 331.

Figure 3:
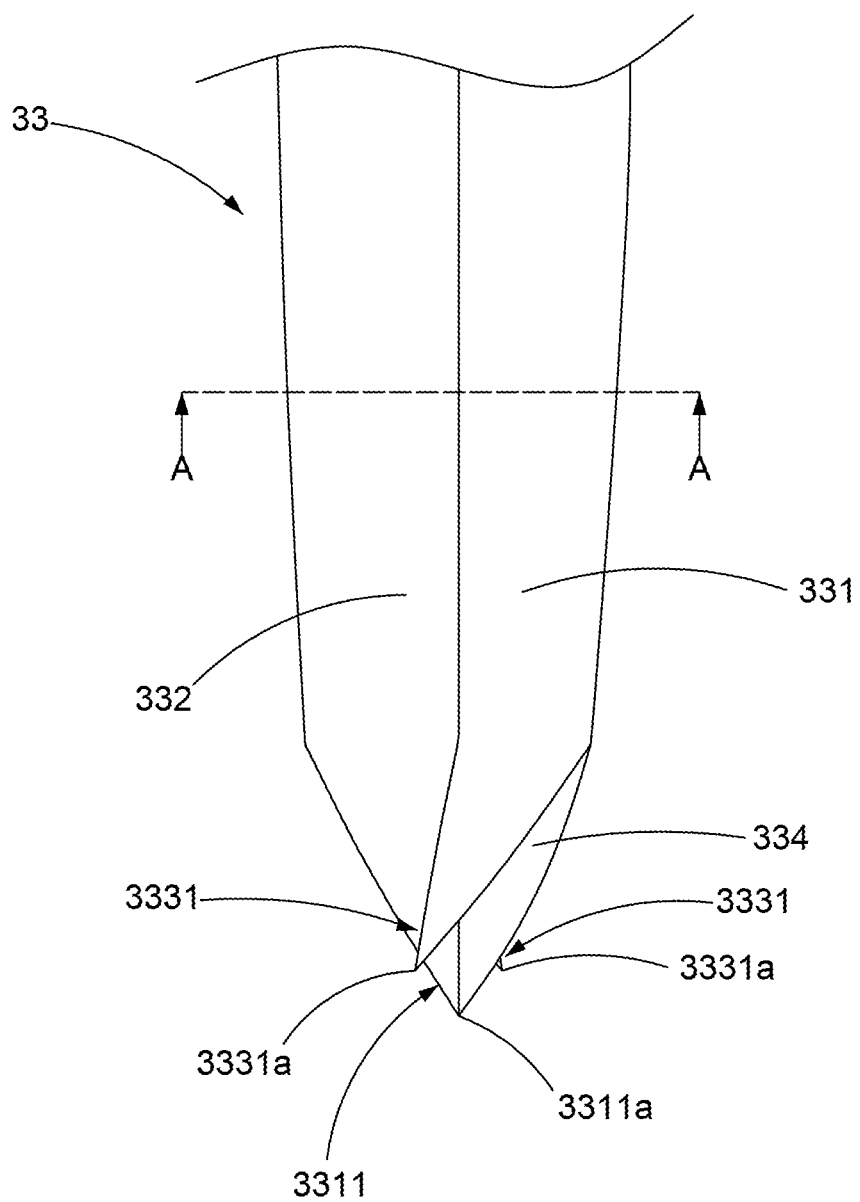
FIG. 3 is a partial and enlarged side view of FIG. 2.

On the drill body 331 are formed a drilling portion 3311 with a first tip 3311a, two blade portions 3331 each connected to each of the cutting edges 333, and two opposite concave surface 334 extending between the drilling portion 3311 and the blade portions 3331. The drilling portion 3311 is formed at a distal end of the drill body 331 situated opposite to the head 31. The drilling portion 3311 terminates at the first tip 3311a situated at a center of the shank 32. In other words, the central axis 32a passes through the first tip 3311a. Each blade portion 3331 is a portion extending from each cutting edge 333 and tapering at a second tip 3331a. The two blade portions 3331 are located opposite to each other, so the drilling portion 3311 with the first tip 3311a is located between the two second tips 3331a of the two blade portions 3331, as shown in FIGS. 2 to 4. Each concave surface 334 is a surface curved inwards or recessedly formed on each side of the drill body 331 and extending from the drilling portion 3311 to each blade portion 3331. Thus, it is preferable that each concave surface 334, as shown, forms a curved edge 334a between each second tip 3331a and the first tip 3311a. Further, in the preferred embodiment, it is preferable that the first tip 3311a and the second tips 3331a are situated at different places. In other words, they are not on the same horizontal line. For example, FIG. 2 shows at least two parallel horizontal reference lines L1, L2, one of which passes the first tip 3311a and the other one passes one or both second tips 3331a. The first horizontal line L1 is set below the second horizontal line L2 so that a distance D1 between the first tip 3311a and the head 31 is larger than a distance D2 between the second tip 3331a and the head 31.

The drilling portion 3311 has a first included angle a1 of not more than 60 degrees. The first included angle a1 can be equal to or less than 60 degrees, preferably between 30 degrees and 60 degrees. Each blade portion 3331 has a second included angle a2 of not more than 50 degrees. The second included angle a2 can be equal to or less than 50 degrees, preferably between 30 degrees and 50 degrees. Accordingly, the drilling portion 3311 and the blade portions 3331 can have an optimum sharpness for decreasing screwing resistance, namely the resistance to the screwing operation.

Figure 5:
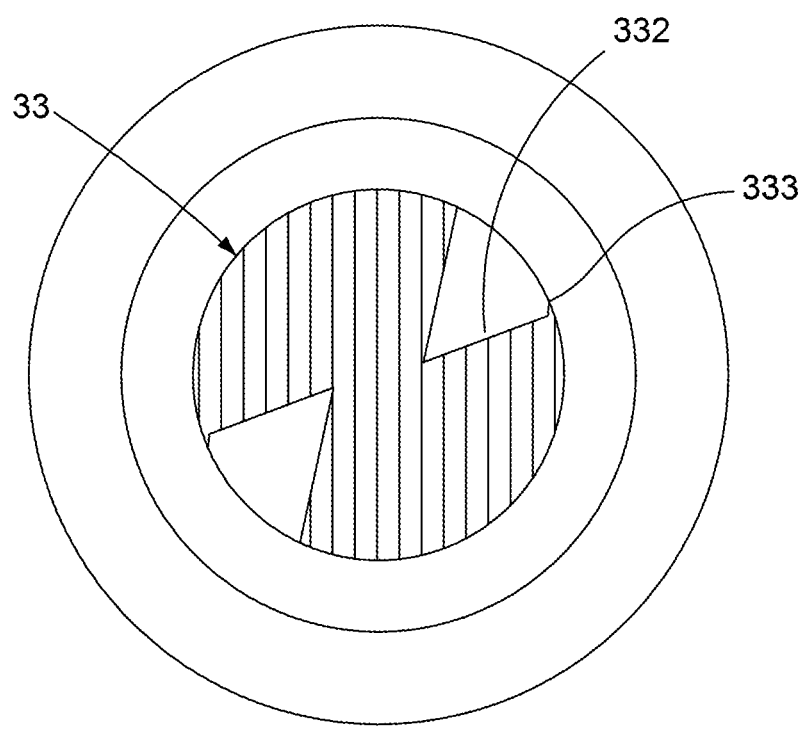
FIG. 5 is a cross-sectional view taken along the A-A line of FIG. 3.
Figure 6:
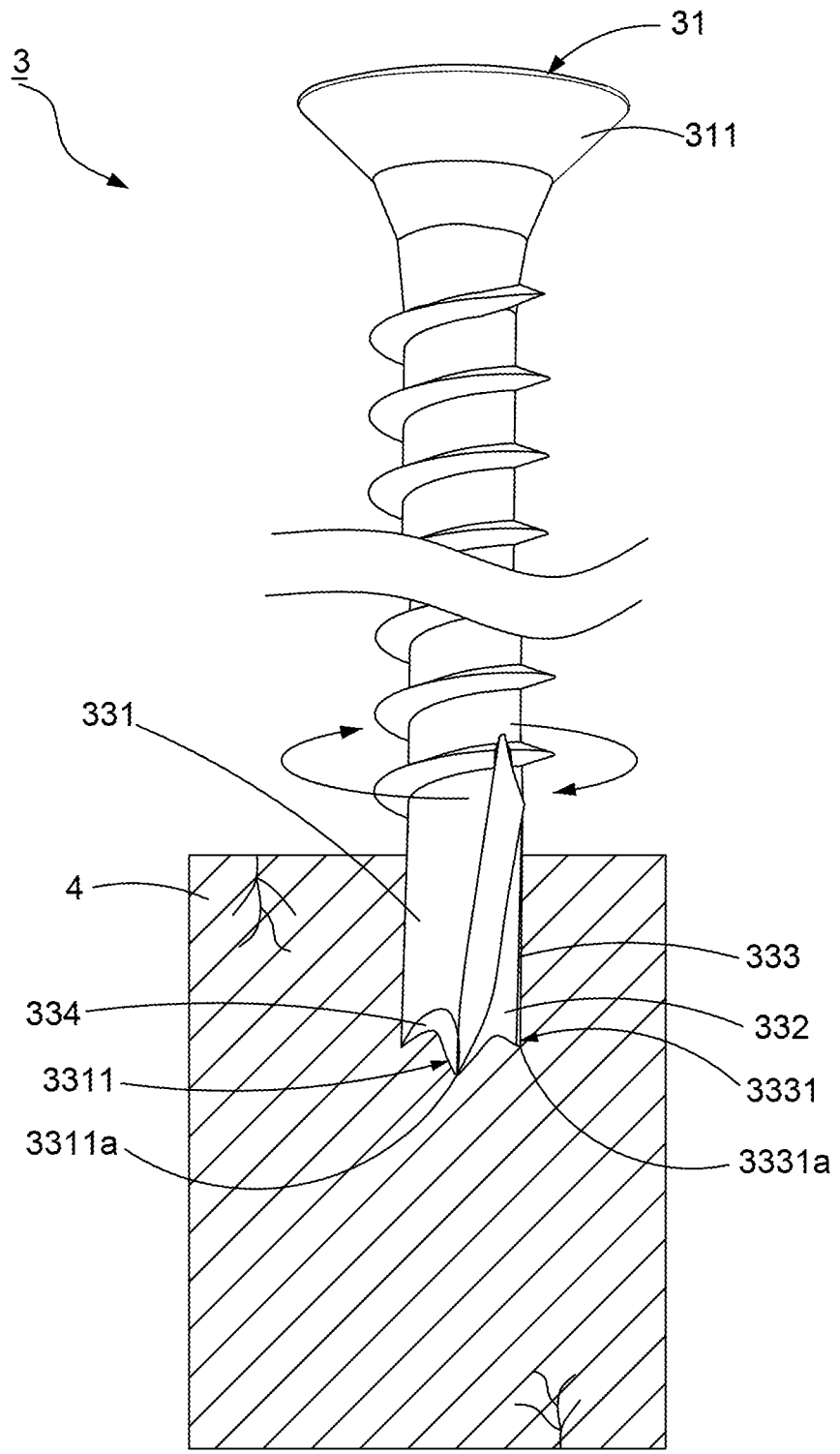
FIG. 6 is a schematic view showing the screwing operation of, the first preferred embodiment of this invention.

Referring to FIG. 5, it is preferable that each cutting edge 333 extends in a counterclockwise direction when viewed from the distal end of the drill body 331. For example, a surface portion of the drill body 331 may be slightly curved or inclined and then meet the adjacent discharge groove 332 at the cutting edge 333 so that the cutting edge 333 points in a direction which is the same as a screwing direction of the screw 3 when viewed from the head 31. Thus, the cutting edge 333 faces the discharge groove 332 as shown to execute a smooth and sharp cutting operation. It is also preferable that each blade portion 3331, shown in FIG. 4, extends in a counterclockwise direction when viewed from the distal end of the drill body 331, thereby allowing the second tip 3331a to point in a direction which is the same as the screwing direction and face each discharge groove 332 when viewed from the head 31. According to the above arrangement, a curvilinear way is presented so that the outline of the end of the leading section 33 shows a shape of a curved bow riser in FIG. 4.

A screwing operation f this invention is described with the aid of FIGS. 2 to 6. The drilling portion 331 is put on a surface of a workpiece 4 before the screwing operation starts. Because the first tip 3311a is set below the two second tips 3331a, the first tip 3311a serves as a single contact point against the workpiece 4. Because of the optimum sharpness caused by the first included angle a1 of not more than 60 degrees, this single contact point punctures the workpiece 4 easily for being firmly and accurately positioned. When the head 31 is rotated in a screwing direction as arrowed in FIG. 6 and the first tip 3311a enters the workpiece 4 gradually under the rotation of the head 31, the two second tips 3331a come into contact with the workplace 4. Because the second tips 3331a of the blade portions 3331 point in the screwing direction when viewed from the head 31 and cooperate with the first tip 3311a, multiple points are created for cutting the workpiece 4 at the beginning of the screwing operation. Meanwhile, the outline of the curved bow riser, formed when the blade portions 3331, concave surfaces 334, and the drilling portion 3311 are arranged as a whole, also assists the blade portions 3331 in cutting the workpiece 4 in a sharp way and decreases the friction between the drill body 331 and the workpiece 4 to reduce the screwing resistance. Then, chips caused by the cutting operation of the drilling portion 3311 and blade portions 3331 are directly led to the discharge grooves 332 which extend from the drilling portion 3311 to an outer side of respective blade portions 3331 for attaining quick removal. It is also possible that the chips pass the concave surfaces 334 and then enter the discharge grooves 332. The concave surfaces 334 also help reduce the contact area between the drill body 331 and the workpiece 4 to decrease the friction and screwing resistance. Thus, the chips are removed smoothly and quickly, and the accumulation of excessive chips is prevented so that the workplace 4 does not crack easily.

When the chips move to the discharge grooves 332, the cutting edges 333 keep cutting the chips. Because the cutting edges 333, formed along the border of the discharge grooves 332, point in the screwing direction when viewed from the head 31, the cutting edges 333 not only cut but also sever the chips efficiently to prevent the chips from twisting round the drill body 331 and decrease the resistance. Thus, the screw 3 is quickly screwed into the workpiece to complete the screwing operation.

Figure 7:
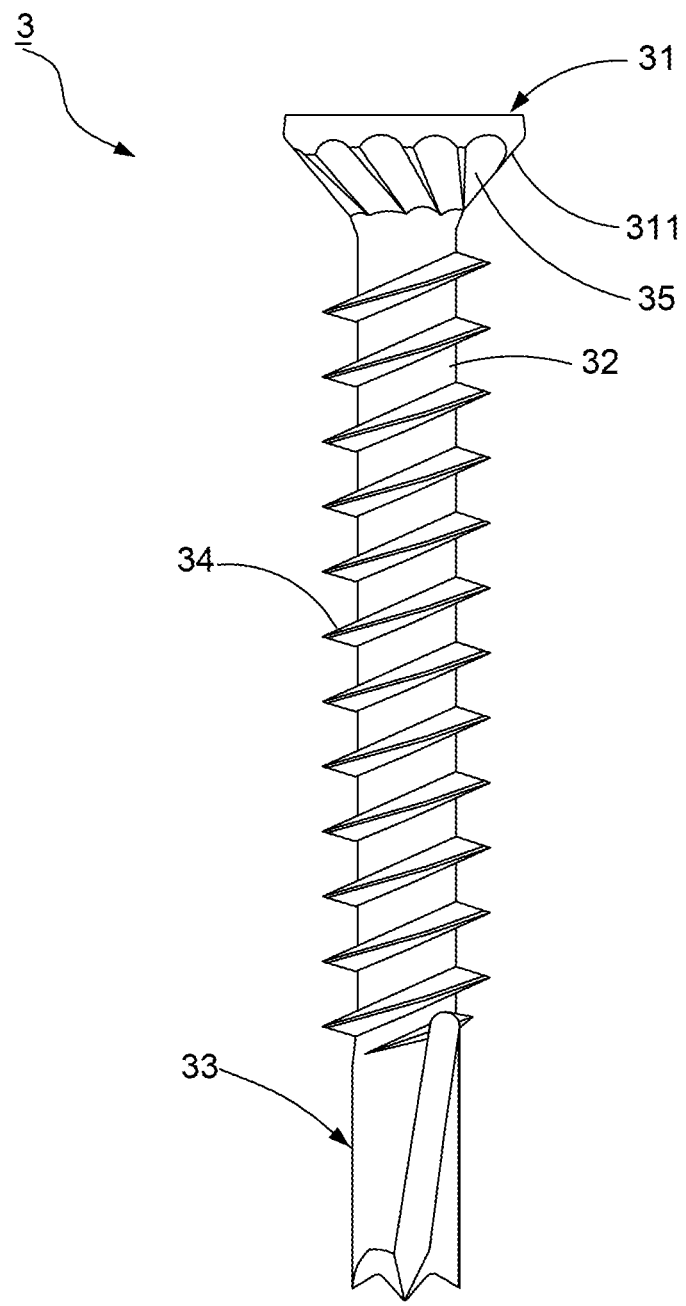
FIG. 7 is a schematic view showing a second preferred embodiment of this invention.

Referring to FIG. 7, a second preferred embodiment of a self-drilling screw 3 has the same elements and operations as those of the first preferred embodiment. The second preferred embodiment is characterised in that the bottom surface 311 of the head 31 has a plurality of slots 35 formed thereon. When the head 31 meets the surface of the workpiece (not shown in this figure), the slots 35 cut and press the chips and also allow the head 31 to fit flush with the surface of the workpiece, thereby increasing the fastening effect.

To sum up, this invention takes advantage of two blade portions and two concave surfaces at two sides of the drilling portion to make the end of the leading section present a shape of a curved bow riser. By the above arrangement, the first tip of the drilling portion is accurately positioned on the workpiece and then the second tips of the blade portions and the cutting edges cut for drilling into the workpiece quickly in a sharp way. The concave surfaces and the discharge grooves of the leading section facilitate quick removal of chips caused by the cutting operations. Thus, undue accumulation of chips is prevented to decrease the screwing resistance and prevent the workpiece from cracking during the screwing operation.

While the embodiments are shown and described above, it is understood that further variations and modifications may be made without departing from the scope of this invention.

What is claimed is:

1. A self-drilling screw, comprising:
a head having a bottom surface;
a shank extending longitudinally from said bottom surface of said head and defining a central axis, wherein said shank forms a leading section located opposite to said head, said leading section including a drill body, two opposite discharge grooves formed on opposite sides of said drill body, and two cutting edges, each cutting edge formed at an intersection of said drill body and a corresponding one of the discharge grooves; and
a plurality of thread convolutions spirally disposed around said shank;
wherein a drilling portion is formed at a distal end of said drill body opposite to said head and terminates at a first tip, said central axis of said shank passing through said first tip, two blade portions formed on said drill body and located opposite to each other, thereby said drilling portion is located between and in spaced relationship with respect to said two blade portions, each of said two blade portions being connected to a corresponding one of said two cutting edges, and each blade portion connecting with a corresponding one of the cutting edges and tapering to a second tip, two opposite concave surfaces recessedly formed on said opposite sides of said drill body, each of said two concave surfaces extending from said drilling portion to a corresponding one of the blade portions, said drilling portion having a first included angle of not more than 60 degrees, each of said two blade portions having a second included angle of not more than 50 degrees, and a distance between said first tip and said head being larger than a distance between said second tip and said head;
wherein said first included angle of said drilling portion is defined between 30 degrees and 60 degrees, and said second included angle of each of said blade portions is defined between 30 degrees and 50 degrees;
wherein said drilling portion extends between each of said two concave surfaces and an apex of said first tip, said apex of said first tip being a singular point; and
wherein a curved edge extends between each of the second tips and the first tip, and each of the concave surfaces intersecting with the corresponding discharge groove to form a respective curved edge.

2. The self-drilling screw according to claim 1, wherein each of said two cutting edges extends in a counterclockwise direction when viewed from said distal end of said drill body.

3. The self-drilling screw according to claim 1, wherein each of said two blade portions extends in a counterclockwise direction when viewed from said distal end of said drill body.

4. The self-drilling screw according to claim 1, wherein said bottom surface of said head has a plurality of slots formed thereon.

* * * * *